United States Patent
Tokuda et al.

(10) Patent No.: US 11,472,735 B2
(45) Date of Patent: Oct. 18, 2022

(54) OPTICAL FIBER

(71) Applicant: SUMITOMO ELECTRIC INDUSTRIES, LTD., Osaka (JP)

(72) Inventors: Chiaki Tokuda, Osaka (JP); Katsushi Hamakubo, Osaka (JP); Noriaki Iwaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/257,980

(22) PCT Filed: Apr. 30, 2020

(86) PCT No.: PCT/JP2020/018341
§ 371 (c)(1),
(2) Date: Jan. 5, 2021

(87) PCT Pub. No.: WO2020/255569
PCT Pub. Date: Dec. 24, 2020

(65) Prior Publication Data
US 2021/0221736 A1 Jul. 22, 2021

(30) Foreign Application Priority Data
Jun. 18, 2019 (JP) .............................. JP2019-112809

(51) Int. Cl.
*C03C 25/47* (2018.01)
*C03C 25/105* (2018.01)
(Continued)

(52) U.S. Cl.
CPC ............ *C03C 25/47* (2018.01); *C03C 25/105* (2013.01); *C03C 25/1065* (2013.01); *G02B 6/02395* (2013.01)

(58) Field of Classification Search
CPC ... C03C 25/47; C03C 25/105; C03C 25/1065; G02B 6/02395
See application file for complete search history.

(56) References Cited

U.S. PATENT DOCUMENTS

| | | | |
|---|---|---|---|
| 9,925,560 B2 * | 3/2018 | Armstrong | ............... C08J 7/043 |
| 2012/0321265 A1 | 12/2012 | Terruzzi et al. | |
| 2016/0121365 A1 * | 5/2016 | Armstrong | ........... C09D 5/1618 |
| | | | 427/243 |

FOREIGN PATENT DOCUMENTS

| EP | 3 984 974 A1 | 4/2022 |
|---|---|---|
| EP | 3 988 590 A1 | 4/2022 |

(Continued)

OTHER PUBLICATIONS

Farid Khelifa et al., Effect of photo-crosslinking on the performance of silica nanoparticle-filled epoxidized acrylic copolymer coatings, J. Mater. Chem. A, 2013, 1, 10334 (Year: 2013).*

(Continued)

*Primary Examiner* — Peter Radkowski
(74) *Attorney, Agent, or Firm* — Faegre Drinker Biddle & Reath LLP

(57) ABSTRACT

An optical fiber comprises a glass fiber comprising a core and a cladding, and a coating resin layer covering the outer periphery of the glass fiber, wherein the coating resin layer has a primary resin layer being in contact with the glass fiber and covering the glass fiber and a secondary resin layer covering the outer periphery of the primary resin layer, the secondary resin layer comprises hydrophobic spherical silica particles, and the content of the silica particles is 7% by mass or more and 60% by mass or less based on the total amount of the secondary resin layer, and the absolute value of the surface potential of the optical fiber is 10 mV or more and 60 mV or less.

16 Claims, 1 Drawing Sheet

(51) Int. Cl.
 *C03C 25/1065* (2018.01)
 *G02B 6/02* (2006.01)

(56) References Cited

FOREIGN PATENT DOCUMENTS

| | | | |
|---|---|---|---|
| GB | 2582075 A | | 9/2020 |
| JP | H02-069706 A | | 3/1990 |
| JP | H06183790 A | * | 12/1992 |
| JP | 2000-007717 A | | 1/2000 |
| JP | 2000007717 A | * | 1/2000 |
| JP | 2004-204206 A | | 7/2004 |
| JP | 2010-511770 A | | 4/2010 |
| JP | 2013-018562 A | | 1/2013 |
| WO | WO-2008/069656 A1 | | 6/2008 |
| WO | WO-2019/116967 A1 | | 6/2019 |

OTHER PUBLICATIONS

J. Shiue, Effects of silica nanoparticle addition to the secondary coating of dual-coated optical fibers, Acta Materialia 54 (2006) 2631-2636 (Year: 2006).*

Shiue, J. et al., "Effects of silica nanopartiole addition to the secondary coating of dual-coated optical fibers," Acta Materialia, Jun. 2006, pp. 2631-2636.

* cited by examiner

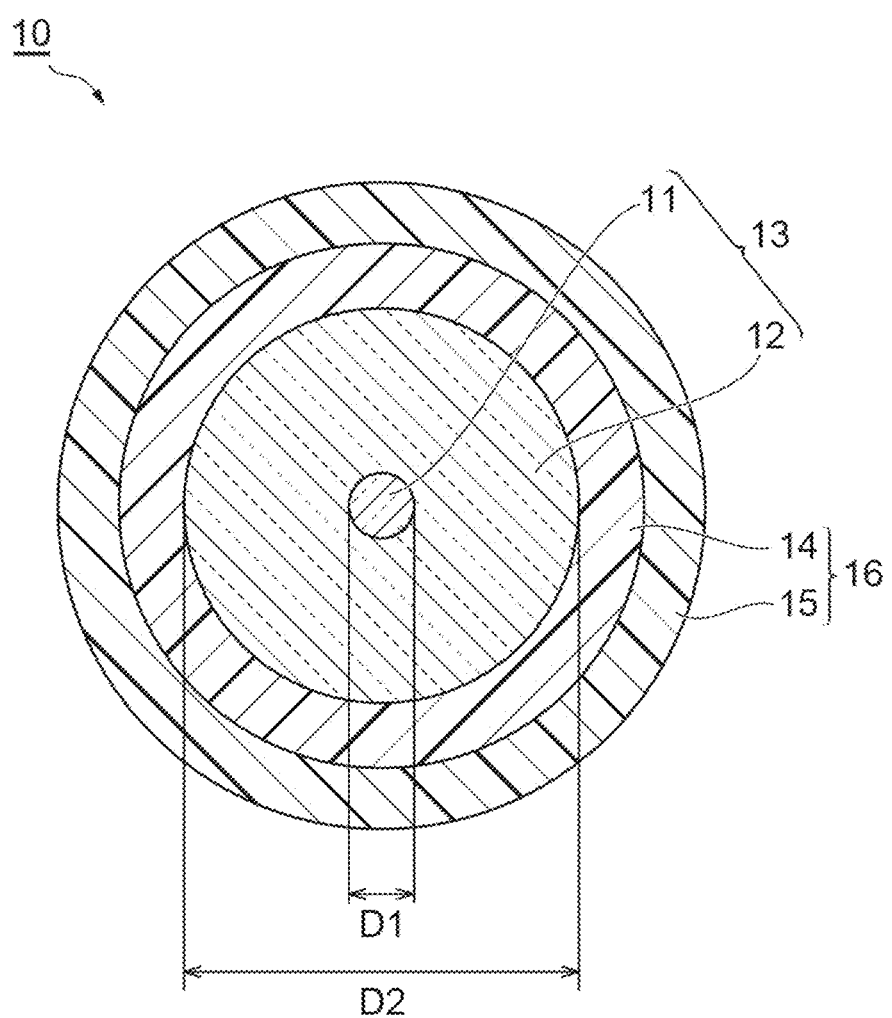

OPTICAL FIBER

TECHNICAL FIELD

The present disclosure relates to an optical fiber.

This application claims priority based on Japanese Patent Application No. 2019-112809 filed on Jun. 18, 2019, and incorporates all the contents described in the Japanese application.

BACKGROUND ART

An optical fiber has generally a coating resin layer for protecting a glass fiber that is an optical transmission medium. The coating resin layer is composed of, for example, a primary resin layer and a secondary resin layer. When the optical fiber is charged, disconnection easily occurs due to the adhesion of foreign matter, and therefore winding failure easily occurs when the optical fiber is wound on a bobbin. Since the optical fiber is easily charged, the optical fiber is wound by using an electrostatic eliminator (for example, refer to Patent Literature 1).

CITATION LIST

Patent Literature

[Patent Literature 1] JP 2013-18562A

SUMMARY OF THE INVENTION

An optical fiber according to an aspect of the present disclosure comprises a glass fiber comprising a core and a cladding, and a coating resin layer covering the outer periphery of the glass fiber, wherein the coating resin layer has a primary resin layer being in contact with the glass fiber and covering the glass fiber and a secondary resin layer covering the outer periphery of the primary resin layer, the secondary resin layer comprises hydrophobic spherical silica particles, and the content of the silica particles is 7% by mass or more and 60% by mass or less based on the total amount of the secondary resin layer, and the absolute value of the surface potential of the optical fiber is 10 mV or more and 60 mV or less.

BRIEF DESCRIPTION OF DRAWING

FIG. 1 is a schematic cross-section diagram showing an example of the optical fiber according to the present embodiment.

DESCRIPTION OF EMBODIMENTS

[Problem to be Solved by the Present Disclosure]

In order to prevent winding failure of the optical fiber, it is necessary to install an electrostatic eliminator at several places, which requires equipment costs, maintenance costs, and the like. The optical fiber is required to be hardly charged and to reduce disconnection due to foreign matter adhesion.

An object of the present disclosure is to provide an optical fiber capable of suppressing charging and reducing disconnection due to adhesion of foreign matter or the like.

[Effect of the Present Disclosure]

The present disclosure can provide an optical fiber capable of suppressing charging and reducing disconnection due to adhesion of foreign matter or the like.

DESCRIPTION OF EMBODIMENTS OF THE PRESENT DISCLOSURE

First, the contents of the embodiment of the present disclosure will be described by listing them. An optical fiber according to an aspect of the present disclosure comprises a glass fiber comprising a core and a cladding, and a coating resin layer covering the outer periphery of the glass fiber, wherein the coating resin layer has a primary resin layer being in contact with the glass fiber and covering the glass fiber and a secondary resin layer covering the outer periphery of the primary resin layer, the secondary resin layer comprises hydrophobic spherical silica particles, and the content of the silica particles is 7% by mass or more and 60% by mass or less based on the total amount of the secondary resin layer, and the absolute value of the surface potential of the optical fiber is 10 mV or more and 60 mV or less.

It is conceivable that uniformly dispersing the silica particles in the secondary resin layer can increase the absolute value of the surface potential of the optical fiber and thus suppress charging of the optical fiber to reduce disconnection of the optical fiber due to adhesion of foreign matter or the like.

Due to excellent dispersion properties in the resin composition and easy adjustment of the surface potential of the optical fiber, the average particle size of the above silica particles may be 5 nm or more and 400 nm or less.

Due to improvement of the strength of the optical fiber, the Young's modulus of the secondary resin layer may be 1200 MPa or more and 3000 MPa or less at 23° C.

The outside diameter of the optical fiber may be 200±15 μm. Having the secondary resin layer according to the present embodiment, even a small-diameter optical fiber hardly causes disconnection. From the viewpoint of suppressing charging of the optical fiber and reducing the disconnection due to adhesion of foreign matter or the like, the secondary resin layer may include a cured product of a resin composition comprising a base resin containing an oligomer comprising urethane (meth)acrylate, a monomer, and a photopolymerization initiator, and hydrophobic spherical silica particles.

Detail of Embodiment of the Present Disclosure

Specific examples of a resin composition and an optical fiber according to the present embodiment will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

In order to suppress charging of the optical fiber, the absolute value of the surface potential of the optical fiber is 10 mV or more and 60 mV or less, preferably 10 mV or more and 50 mV or less, and more preferably 15 mV or more and 40 mV or less.

(Secondary Resin Layer)

From the viewpoint of suppressing charging of the optical fiber and reducing the disconnection due to adhesion of foreign matter or the like, the secondary resin layer 15 can be formed by curing a resin composition comprising a base resin containing an oligomer comprising urethane (meth) acrylate, a monomer, and a photopolymerization initiator, and hydrophobic spherical silica particles. That is, the secondary resin layer 15 may include a cured product of a resin composition comprising a base resin containing an oligomer comprising urethane (meth)acrylate, a monomer, and a photopolymerization initiator, and hydrophobic spherical silica particles.

(Meth)acrylate means an acrylate or a methacrylate corresponding to it. The same applies to (meth)acrylic acid and the like.

The silica particles according to the present embodiment are spherical particles and have a surface subjected to hydrophobic treatment. The hydrophobic treatment according to the present embodiment is introduction of a hydrophobic group onto the surface of the silica particles. The silica particles having a hydrophobic group introduced have excellent dispersion properties in the resin composition. The hydrophobic group may be a reactive group (ultraviolet curable functional group) such as a (meth)acryloyl group, or may be a non-reactive group such as an aliphatic hydrocarbon group (for example, an alkyl group) or an aromatic hydrocarbon group (for example, a phenyl group). In the case of the silica particles having a reactive group, the resin layer having high Young's modulus is easy to form.

In order to easily suppress charging of the optical fiber and reduce the disconnection due to the adhesion of foreign matter or the like, the silica particles according to the present embodiment may have an ultraviolet curable functional group. Treating the spherical silica particles with a silane compound having an ultraviolet curable functional group can introduce an ultraviolet curable functional group onto the surface of the spherical silica particles.

Examples of the silane compound having ultraviolet curable functional groups include 3-methacryloxypropyltrimethoxysilane, 3-acryloxypropyltrimethoxysilane, 3-methacryloxypropyltriethoxysilane, 3-acryloxypropyltriethoxysilane, 8-methacryloxyoctyltrimethoxysilane, 8-acryloxyoctyltrimethoxysilane, 7-octenyltrimethoxysilane, vinyltrimethoxysilane, and vinyltriethoxysilane.

The silica particles according to the present embodiment are dispersed in a dispersion medium. Using the silica particles dispersed in the dispersion medium allows for uniform dispersion of the silica particles in the resin composition, and the silica particles remain to be dispersed even in the resin layer formed of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, polytetramethylene glycol di(meth)acrylate, 2-hydroxy-3-phenoxypropyl acrylate, (meth)acrylic acid adduct of propylene glycol diglycidyl ether, (meth)acrylic acid adduct of tripropylene glycol diglycidyl ether, and (meth)acrylic acid adduct of glycerin diglycidyl ether. As the (meth)acryloyl compound, compounds exemplified by monomers described below may be used.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the spherical silica particles dispersed in the dispersion medium and removing a part of the dispersion medium.

The silica particles dispersed in the dispersion medium remains to be dispersed in the resin layer after curing of the resin composition. When a reactive dispersion medium is used, the silica particles are mixed with the dispersion medium in the resin composition and are incorporated in the resin layer with the dispersion condition maintained. When a non-reactive dispersion medium is used, at least a part of the dispersion medium evaporates and disappears from the resin composition, but the silica particles remain in the resin composition with the dispersion condition remained and are also present in the cured resin layer with the dispersion condition remained. Electron microscope observation shows that the silica particles present in the resin layer are in the condition of dispersion of the primary particle.

From the viewpoint of easily imparting appropriate hardness to the resin layer, and the like, it is preferable to use the silica particles having an ultraviolet curable functional group as the silica particles according to the present embodiment.

From the viewpoint of imparting appropriate toughness to the secondary resin layer, the average primary particle size of the silica particles is preferably 400 nm or less, and more preferably 300 nm or less. From the viewpoint of increasing the Young's modulus of the secondary resin layer, the average primary particle size of the silica particles is preferably 5 nm or more, and more preferably 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the hydrophobic spherical silica particles is preferably 7% by mass or more and 60% by mass or less, more preferably 8% by mass or more and 55% by mass or less, and further preferably 10% by mass or more and 50% by mass or less based on the total amount of the resin composition (total amount of the base resin and the silica particles). The content of the hydrophobic spherical silica particles is 7% by mass or more allows for easy increase in the absolute value of the surface potential of the optical fiber. The content of the hydrophobic spherical silica particles is 60% by mass or less allows for adjustment of the Young's modulus of the resin composition and formation of tough resin layer. Since the total amount of the resin composition hardly changes with curing, the total amount of the resin composition may be considered as the total amount of the cured product of the resin composition.

The base resin according to the present embodiment contains an oligomer comprising urethane (meth)acrylate, a monomer, and a photopolymerization initiator.

An oligomer obtained by reacting a polyol compound, a polyisocyanate compound, and a hydroxyl group-containing (meth)acrylate compound can be used as the urethane (meth)acrylate.

Examples of the polyol compound include polytetramethylene glycol, polypropylene glycol and bisphenol A-ethylene oxide addition diol. The number average molecular weight of the polyol compound may be 400 to 1000. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

As a catalyst for synthesizing a urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the view point of easy availability or catalyst performance, it is preferable that dibutyltin dilaurate or dibutyltin diacetate be used as catalyst.

When the urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Due to easy increase in the surface potential of the optical fiber, the oligomer may further include an epoxy (meth)acrylate. An oligomer obtained by reacting a compound having a (meth)acryloyl group with an epoxy resin having two or more glycidyl groups can be used as an epoxy (meth)acrylate.

Due to increase in the toughness of the resin layer, the content of the epoxy (meth)acrylate is preferably 10% by mass or more and 55% by mass or less, more preferably 15% by mass or more and 50% by mass or less, and further preferably 20% by mass or more and 45% by mass or less based on the total amount of the oligomer and the monomer.

At least one selected from the group consisting of a monofunctional monomer having one polymerizable group and a multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing monomer such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include: monomers having two polymerizable groups such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9- nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, and EO adduct of bisphenol A di(meth)acrylate; and monomers having three or more polymerizable groups such as trimethylolpropane tri(meth)acrylate, trimethyloloctane tri(meth)acrylate, trimethylolpropane polyethoxytri(meth)acrylate, trimethylolpropane polypropoxytri(meth)acrylate, trimethylolpropane polyethoxypolypropoxytri(meth)acrylate, tris [(meth)acryloyloxyethyl]isocyanurate, pentaerythritol tri(meth)acrylate, pentaerythritol polyethoxytetra(meth)acrylate, pentaerythritol polypropoxytetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris [(meth)acryloyloxyethyl]isocyanurate.

From the viewpoint of increasing the Young's modulus of the resin layer, the monomer preferably includes a multifunctional monomer, and more preferably includes a monomer having two polymerizable groups.

The photopolymerization initiator can be appropriately selected from known radical photopolymerization initiators and used. Examples of the photopolymerization initiator include 1-hydroxycyclohexyl phenyl ketone (Omnirad 184 manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

The resin composition may further contain a silane coupling agent, a leveling agent, an antifoaming agent, an antioxidant, and a sensitizer.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl] disulfide, γ-trimethoxysilylpropyldimethylthiocarbamyl tetrasulfide, and γ-trimethoxysilylpropyl benzothiazyl tetrasulfide.

The Young's modulus of the secondary resin layer is preferably 1200 MPa or more and 3000 MPa or less at 23° C., more preferably 1250 MPa or more and 2800 MPa or less, and further preferably 1300 MPa or more and 2700 MPa or less. A Young's modulus of the secondary resin layer of 1200 MPa or more is easy to improve the lateral pressure characteristics, and the Young's modulus of 3000 MPa or less can provide proper toughness to the secondary resin layer, and thus is easy to improve low temperature characteristics.

(Primary Resin Layer)

The primary resin layer 14 can be formed by curing a resin composition including an oligomer comprising urethane (meth)acrylate, a monomer, a photopolymerization initiator and a silane coupling agent. Prior art techniques can be used for a resin composition for the primary resin layer. A urethane (meth)acrylate, a monomer, a photopolymerization initiator and a silane coupling agent may be appropriately selected from compounds exemplified in the above base resin. The resin composition constituting the primary resin layer has composition different from the base resin forming the secondary resin layer.

From the viewpoint of suppressing the generation of voids in the optical fiber, the Young's modulus of the primary resin layer is preferably 0.04 MPa or more and 1.0 MPa or less at 23° C., more preferably 0.05 MPa or more and 0.9 MPa or less, and further preferably 0.05 MPa or more and 0.8 MPa or less.

EXAMPLES

Hereinafter, the results of evaluation test using Examples and Comparative Examples according to the present disclosure will be shown, and the present disclosure is described in more detail. The present invention is not limited to these examples.

[Resin composition for a secondary resin layer]
(Oligomer)

Urethane acrylate (UA) obtained by reacting a polypropylene glycol having a molecular weight of 600, 2,4-tolylene diisocyanate, and hydroxyethyl acrylate, and a bisphenol A type epoxy acrylate (EA) were prepared as the oligomer.

(Monomer)

As the monomer, tripropylene glycol diacrylate (TPGDA), and 2-phenoxyethyl acrylate (PO-A) were prepared.

(Photopolymerization Initiator)

As the photopolymerization initiator, 1-hydroxycyclohexyl phenyl ketone (Omnirad 184) and 2,4,6-trimethylbenzoyldiphenylphosphine oxide (Omnirad TPO) were prepared.

(Silica Particles)

Silica sol including silica particles (Si-1 to Si-4) shown in Table 1 were prepared as the silica particles. Hydrophobic silica particles had a methacryloyl group.

TABLE 1

| Silica particles | Si-1 | Si-2 | Si-3 | Si-4 |
|---|---|---|---|---|
| Shape | Spherical | Spherical | Spherical | Spherical |
| Surface condition | Hydrophobic | Hydrophobic | Hydrophobic | Hydrophilic |
| Average particle size (nm) | 10 | 100 | 300 | 10 |

(Resin Composition)

First, a base resin was prepared by mixing the above oligomer, monomer, and photopolymerization initiator. Next, the silica sol was mixed with the base resin so as to have the content of the silica particles shown in Table 2 or Table 3, and then most of MEK, as a dispersion medium was removed under reduced pressure to produce resin compositions for the secondary resin layer, respectively. The content of remaining MEK in the resin composition was 5% by mass or less.

In Table 2 and Table 3, the values of the oligomer and the monomer are the content based on the total amount of the oligomer and the monomer, and the value of the silica particles is the content based on the total amount of the resin composition.

(Presence or Absence of Disconnection)

When the optical fiber was drawn at 1500 m/min and 100 km thereof was drawn, the case without disconnection was defined as "A", and the case with disconnection was defined as "B".

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Oligomer | UA | 50 | 50 | 50 | 50 | 32 | 32 | 32 | 15 | 15 | 15 |
| (% by mass) | EA | 15 | 15 | 15 | 15 | 40 | 40 | 40 | 45 | 45 | 45 |
| Monomer | TPGDA | 20 | 20 | 20 | 20 | 18 | 18 | 18 | 30 | 30 | 30 |
| (% by mass) | POA | 15 | 15 | 15 | 15 | 10 | 10 | 10 | 10 | 10 | 10 |
| Silica particles | Si-1 | 10 | 30 | 40 | 50 | 10 | 30 | 40 | 10 | 30 | 40 |
| (% by mass) | Dispersion property | Uniform | Uniform | Uniform | Uniform | Uniform | Uniform | Uniform | Uniform | Uniform | Uniform |
| Surface potential (mV) |  | 11 | 17 | 19 | 22 | 21 | 25 | 27 | 31 | 35 | 37 |
| Presence or absence of disconnection |  | A | A | A | A | A | A | A | A | A | A |

<Dispersion Condition of Resin Composition>

The resin composition was diluted 100-fold with MEK, and the zeta potential at a voltage of 200 V was measured by using the zeta potential/particle size/molecular weight measurement system "ELSZ-2000" manufactured by Otsuka Electronics Co., Ltd. When the absolute value of the zeta potential was more than 30 mV, the silica particles were judged to be uniformly dispersed in the resin composition.

[Resin Composition for the Primary Resin Layer]

Urethane acrylate obtained by reacting polypropylene glycol having a molecular weight of 4000, isophorone diisocyanate, hydroxyethyl acrylate, and methanol was prepared. 75 parts by mass of the urethane acrylate, 12 parts by mass of a nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to obtain a resin composition for the primary resin layer.

[Production of an Optical Fiber]

On the outer periphery of a 125 μm diameter glass fiber composed of a core and cladding, a primary resin layer with a thickness of 20 μm was formed by using a resin composition for the primary resin layer, and a secondary resin layer having a width of 15 μm was formed on the outer periphery thereof by using a resin composition for the secondary resin layer to produce optical fibers. A linear speed was 1500 m/min.

(Surface Potential of Optical Fiber)

Using "ELSZ-2000", the surface potential of the optical fiber at an applied voltage of 60 V was measured at room temperature. The measurement was performed according to the following procedure.

First, prepared was a solution of monitor particles in which particles of polystyrene latex (particle size: 520 nm), as the monitor particles, coated with hydroxypropylene cellulose (Mw: 300000) were dispersed in a 10 mM NaCl aqueous solution. Next, 100 optical fibers were spread in a spacer and set in a cell for zeta potential of "ELSZ-2000", and then a solution of monitor particles filtered with a filter having a pore size of 0.1 μm was injected into the cell. Electrophoretic measurements of the monitor particles were performed in the cell depth direction. The apparent velocity distribution inside the measured cell was analyzed by the Mori-Okamoto formula, and the surface potential of the optical fiber was determined.

TABLE 3

|  |  | Example 11 | Example 12 | Comparative Example 1 | Comparative Example 2 |
|---|---|---|---|---|---|
| Oligomer | UA | 50 | 50 | 50 | 50 |
| (% by mass) | EA | 15 | 15 | 15 | 15 |
| Monomer | TPGDA | 20 | 20 | 20 | 20 |
| (% by mass) | POA | 15 | 15 | 15 | 15 |
| Silica particles | Si-1 | — | — | — | 1 |
| (% by mass) | Si-2 | 40 | — | — | — |
|  | Si-3 | — | 40 | — | — |
|  | Si-4 | — | — | 30 | — |
|  | Dispersion property | Uniform | Uniform | Ununiform | Uniform |
| Surface potential (mV) |  | 19 | 19 | 7 | 4 |
| Presence or absence of disconnection |  | A | A | B | B |

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. An optical fiber comprising:
   a glass fiber comprising a core and a cladding; and
   a coating resin layer covering an outer periphery of the glass fiber,
   wherein the coating resin layer has a primary resin layer being in contact with the glass fiber and covering the glass fiber and a secondary resin layer covering an outer periphery of the primary resin layer,
   the secondary resin layer comprises hydrophobic spherical silica particles having a (meth)acryloyl group, and a content of the silica particles is 7% by mass or more and 60% by mass or less based on a total amount of the secondary resin layer, and
   an absolute value of surface potential is 10 mV or more and 60 mV or less.

2. The optical fiber according to claim 1, wherein an average primary particle size of the silica particles is 5 nm or more and 400 nm or less.

3. The optical fiber according to claim 1, wherein a Young's modulus of the secondary resin layer is 1200 MPa or more and 3000 MPa or less at 23° C.

4. The optical fiber according to claim 1, wherein an outside diameter thereof is 200±15 μm.

5. The optical fiber according to claim 1, wherein the secondary resin layer comprises a cured product of a resin composition comprising a base resin containing an oligomer comprising urethane (meth)acrylate, a monomer, and a photopolymerization initiator, and the silica particles.

6. The optical fiber according to claim 2, wherein a Young's modulus of the secondary resin layer is 1200 MPa or more and 3000 MPa or less at 23° C.

7. The optical fiber according to claim 2, wherein an outside diameter thereof is 200±15 μm.

8. The optical fiber according to claim 3, wherein an outside diameter thereof is 200±15 μm.

9. The optical fiber according to claim 6, wherein an outside diameter thereof is 200±15 μm.

10. The optical fiber according to claim 2, wherein the secondary resin layer comprises a cured product of a resin composition comprising a base resin containing an oligomer comprising urethane (meth)acrylate, a monomer, and a photopolymerization initiator, and the silica particles.

11. The optical fiber according to claim 3, wherein the secondary resin layer comprises a cured product of a resin composition comprising a base resin containing an oligomer comprising urethane (meth)acrylate, a monomer, and a photopolymerization initiator, and the silica particles.

12. The optical fiber according to claim 4, wherein the secondary resin layer comprises a cured product of a resin composition comprising a base resin containing an oligomer comprising urethane (meth)acrylate, a monomer, and a photopolymerization initiator, and the silica particles.

13. The optical fiber according to claim 6, wherein the secondary resin layer comprises a cured product of a resin composition comprising a base resin containing an oligomer comprising urethane (meth)acrylate, a monomer, and a photopolymerization initiator, and the silica particles.

14. The optical fiber according to claim 7, wherein the secondary resin layer comprises a cured product of a resin composition comprising a base resin containing an oligomer comprising urethane (meth)acrylate, a monomer, and a photopolymerization initiator, and the silica particles.

15. The optical fiber according to claim 8, wherein the secondary resin layer comprises a cured product of a resin composition comprising a base resin containing an oligomer comprising urethane (meth)acrylate, a monomer, and a photopolymerization initiator, and the silica particles.

16. The optical fiber according to claim 9, wherein the secondary resin layer comprises a cured product of a resin composition comprising a base resin containing an oligomer comprising urethane (meth)acrylate, a monomer, and a photopolymerization initiator, and the silica particles.

* * * * *